United States Patent [19]

Mote, Jr.

[11] Patent Number: 5,764,966

[45] Date of Patent: Jun. 9, 1998

[54] METHOD AND APPARATUS FOR REDUCING CUMULATIVE TIME DELAY IN SYNCHRONIZING TRANSFER OF BUFFERED DATA BETWEEN TWO MUTUALLY ASYNCHRONOUS BUSES

[75] Inventor: L. Randall Mote, Jr., Laguna Hills, Calif.

[73] Assignee: Samsung Electronics Co., Ltd., Seoul, Rep. of Korea

[21] Appl. No.: 878,230

[22] Filed: Jun. 18, 1997

Related U.S. Application Data

[63] Continuation of Ser. No. 510,545, Aug. 2, 1995, abandoned, which is a continuation-in-part of Ser. No. 483,505, Jun. 7, 1995, abandoned.

[51] Int. Cl.$^6$ ............................................. G06F 1/12
[52] U.S. Cl. ...................... 395/551; 395/559; 395/306; 395/308
[58] Field of Search ........................ 395/551, 559, 395/306, 308, 309

[56] References Cited

U.S. PATENT DOCUMENTS

5,274,763  12/1993  Banks ................................ 395/308
5,535,341   7/1996  Shah et al. ........................ 395/306

*Primary Examiner*—Ayaz R. Sheikh
*Assistant Examiner*—Jeffrey K. Seto
*Attorney, Agent, or Firm*—Knobbe, Martens, Olson & Bear LLP

[57] ABSTRACT

An interface between first and second data buses includes a first bus state machine which controls data transfers from the first data bus to a data buffer. The interface includes a second bus state machine which controls data transfers from the data buffer to the second data bus. The data buffer includes a plurality of storage locations accessed on a first-in/first-out basis. A respective valid data flag for each storage location is set by the first bus state machine when data are stored in the storage location from the first data bus and is cleared by the second bus state machine when data are transferred from the storage location to the second data bus. The data valid flags are synchronized with first and second bus clocks respectively associated with the first and second bus state machines to assure that the data valid flags change synchronously with respect to each state machine. In order to reduce the time required to output sequential data from multiple data locations in the data buffer, each data valid flag is synchronized independently so that when the second bus state machine selects a new buffer location from which to output data, the data valid flag associated with the new buffer location is already synchronized with the second bus clock and can be immediately checked by the second bus state machine to determine if the data in the new buffer location is valid.

5 Claims, 5 Drawing Sheets

METHOD AND APPARATUS FOR REDUCING CUMULATIVE TIME DELAY IN SYNCHRONIZING TRANSFER OF BUFFERED DATA BETWEEN TWO MUTUALLY ASYNCHRONOUS BUSES

This application is a continuation of U.S. patent application Ser. No. 08/510,545, filed Aug. 2, 1995, now abandoned, which is a continuation-in-part of U.S. patent application Ser. No. 08/483,505, filed Jun. 7,1195 now abandoned.

BACKGROUND OF THE INVENTION

1. Field of the Invention

The present invention is related to computer systems in general, and, more particularly, is related to digital subsystems which control the transfer of data from one synchronous data bus to another synchronous data bus wherein the two data buses are mutually asynchronous.

2. Description of the Related Art

Most modern computer systems have a plurality of different data buses operating at different data rates. It is possible in some systems to relate the different data rates to one common clock such that the different data buses are operating in synchronism with each other. However, in many systems, the different data buses operate asynchronously with respect to each other. That is, the buses are controlled by different clocks wherein the frequencies and phases of the different clocks have no fixed relationships. Thus, the data on a source bus may change at random times with respect to the control signals on a destination bus to which the data are being transferred. Because it is necessary to satisfy minimum setup and hold times on digital devices, such as registers or other storage devices, it is necessary to synchronize the transfers of data between two buses. This is accomplished by synchronization circuits. For example, the source bus may generate a data strobe signal to indicate that the data on the source bus is ready to be transferred. The data strobe signal cannot generally be used to control the destination bus directly. Rather, the data strobe signal is first registered into a control circuit associated with the destination bus by clocking the data strobe signal with the clock signal which controls the destination bus. The registered data strobe signal is then used to control data storage devices (e.g., registers or latches) on the destination bus. By synchronizing the data strobe signal (or other control signal) with the destination bus, it can be assured that the data from the source bus is stable with respect to the destination bus and can therefore be transferred.

Although the synchronization of the data strobe signal assures that data transfers between two mutually asynchronous buses occurs without loss of data, there is time overhead associated with the synchronization. In particular, it may take as much as two clock cycles of the destination bus to achieve the synchronization. For occasional data transfers, the synchronization overhead can be readily tolerated; however, when large quantities of data are transferred by multiple transfers (e.g., burst transfers), the cumulative overhead can significantly reduce the overall performance of a computer system. Thus, a need exists to reduce the synchronization overhead for transfers of bursts of data between two mutually asynchronous buses.

SUMMARY OF THE INVENTION

One aspect of the present invention is an interface circuit between first and second buses which operate asynchronously with respect to each other. The first bus provides data to the interface circuit in synchronism with a first bus clock and the second bus receives data from the interface circuit in synchronism with a second bus clock. The apparatus comprises an input/output buffer comprising at least first and second buffer locations into which data from the first bus are stored in synchronism with the first bus clock. At least first and second data valid indicators are associated respectively with the first and second buffer locations. The first data valid indicator is set synchronously with the first bus clock when data are stored in the first buffer location. The second data valid indicator is set synchronously with the first bus clock when data are stored in the second buffer location. A data valid indicator selector selects one of the first and second data valid indicators as an output data valid indicator. A bus state machine operates synchronously with the second bus clock to transfer data from the input/output buffer to the second bus. The bus state machine selects one of the first and second buffer locations as a source of data to be transferred to the second bus. The bus state machine controls the data valid indicator selector to select a respective one of the first and second data valid indicators as the output data valid indicator. The bus state machine monitors the output data valid indicator to determine when data from the first bus has been stored in the selected first or second buffer location. A first synchronization circuit receives the first data valid indicator and synchronizes it with the second bus clock to provide a first synchronized data valid indicator as an input to the data valid indicator selector. A second synchronization circuit receives the second data valid indicator and synchronizes it with the second bus clock to provide a second synchronized data valid indicator as an input to the data valid indicator selector.

Another aspect of the present invention is an apparatus for transferring data between first and second buses which operate asynchronously with respect to each other. The apparatus comprises a data storage device which comprises a plurality of data storage locations which store data. A first bus interface state machine is connected to the first data bus. The first bus interface state machine transfers data from the first data bus to a selected one of the plurality of data storage locations. A second bus interface state machine is connected to the second data bus. The second bus interface state machine transfers data from a selected one of the plurality of data storage locations to the second data bus. A data present buffer is included which has a respective indicator for each of the plurality of data storage locations. One of the indicators is set in response to the first bus state machine transferring data to the selected one of the plurality of data storage locations and is cleared in response to the second bus state machine transferring data from the selected one of the plurality of data locations to the second data bus. The second bus interface state machine transfers data from the selected one of the plurality of data storage locations only when the selected indicator is set. A set of respective delay circuits are connected between the data present buffer and the second bus interface state machine to delay the indicators so that the second bus interface state machine may not transfer data from the one of the plurality of data storage locations until at least a predetermined time has passed after the first bus interface machine has transferred data into the selected data storage location.

Another aspect of the present invention is an apparatus for transferring data between a first data bus and a second data bus. The first and second data buses operate asynchronously with respect to each other. The apparatus comprises a buffer which includes first and second data storage locations which store data. A first bus interface state machine is connected to the first data bus and the buffer to control data transfers from the first data bus to a selected one of the first and second data storage locations in accordance with a first bus clock signal. A second bus interface state machine is connected to the second data bus and to the buffer to control transfers of data from the buffer to the second data bus in accordance with a second bus clock signal operating asynchronously with respect to the first bus clock signal. First and second flag buffers have respective first and second flag outputs coupled to both the first and second bus interface state machines. The output of the first flag buffer is set synchronously with respect to the first bus clock signal when data are transferred into the first data storage location from the first data bus and is cleared synchronously with the second bus clock signal when data are transferred from the first data storage location to the second data bus. The second flag buffer output is set synchronously with respect to the first bus clock signal when data are transferred into the second data storage location from the first data bus and is cleared synchronously with respect to the second bus clock signal when data are transferred from the second data storage location to the second data bus. A first synchronizer is connected between the first flag buffer and the second bus interface state machine. A second synchronizer is connected between the second flag buffer and the second bus interface state machine. The first synchronizer synchronizes the first flag output to the second bus clock signal so that the first flag output is delayed for at least a predetermined time before the first flag output can be received by the second bus interface state machine after the first flag output is changed. The second synchronizer synchronizes the second flag output to the second bus clock signal so that the second flag output is delayed for at least the predetermined time before the second flag output can be received by the second bus interface state machine after the second flag output is changed.

BRIEF DESCRIPTION OF THE DRAWINGS

The present invention will be described below in connection with the accompanying drawing figures in which.

DETAILED DESCRIPTION OF THE PREFERRED EMBODIMENT

Figure 1:
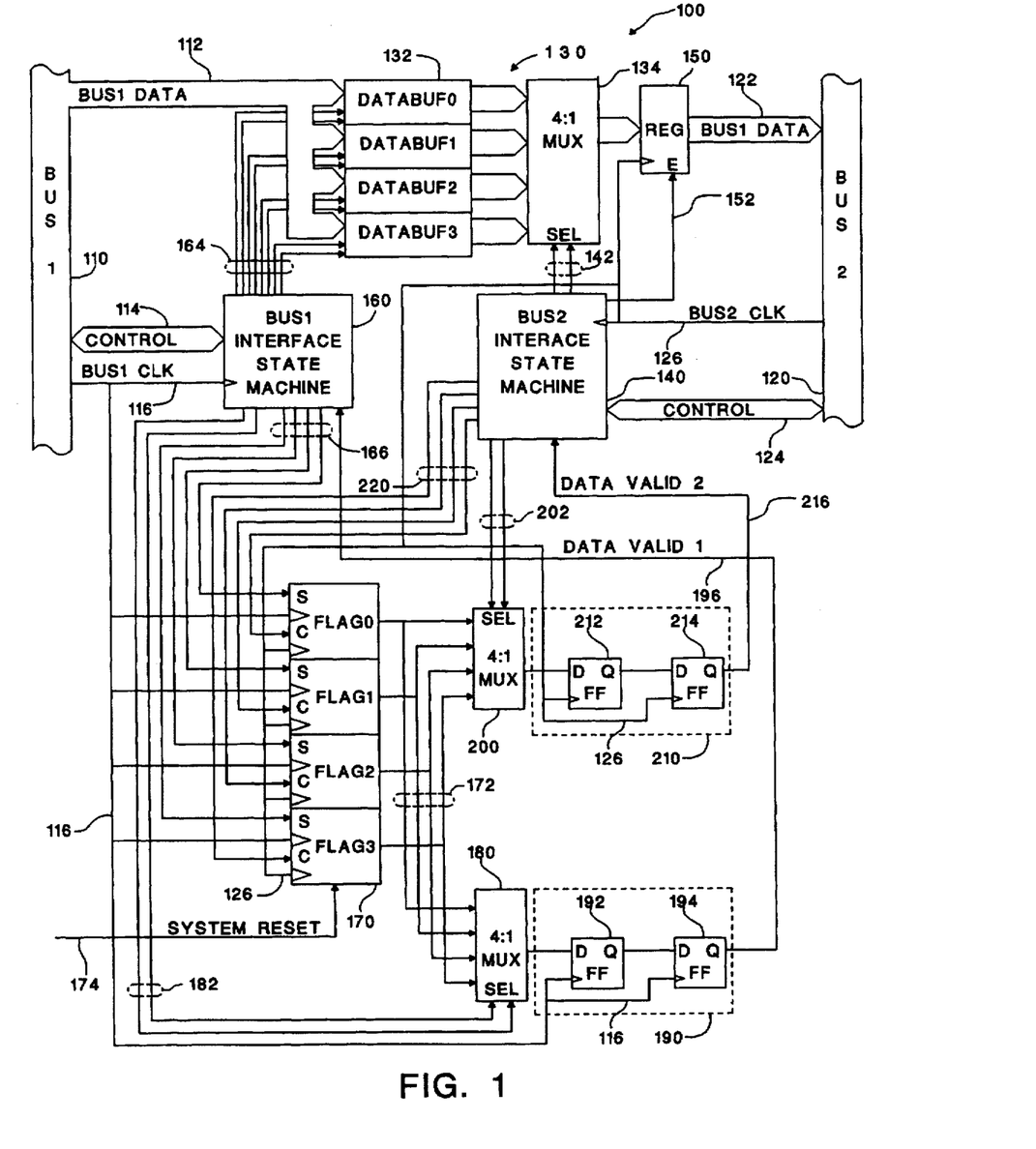
FIG. 1 illustrates an exemplary interface between two asynchronous buses.

FIG. 1 illustrates an exemplary interface 100 between two mutually asynchronous buses in accordance with known systems. As illustrated in FIG. 1, the interface is connected to a first bus (BUS 1) 110. In the embodiment described herein, the first bus 110 is preferably a PCI (Peripheral Component Interconnect) bus which operates in accordance with the standard established for the PCI bus for use in microprocessor-based computers, such as computers based upon the INTEL® family of microprocessors (e.g., the INTEL 80486, the INTEL Pentium, the INTEL P6, and the like). Basically, the first bus 110 is a 32-bit data bus having a plurality of data lines (shown as BUS1 DATA 112) which transfer data on the first bus 110, a plurality of address lines (not shown) which provide a source or destination address for data transferred on the first bus 110, and a plurality of control lines (shown as CONTROL 114) which communicate control signals which control the transfer of data on the first bus 110. The first bus 110 also includes a first bus clock line (BUS1 CLK) 116 having a clock signal thereon which synchronizes the address, data and control signals on the first bus 110. For example, the clock signal on the BUS1 CLK line 116 advantageously operates at 33 MHz. The operation of the first bus 110 is well-known to persons skilled in the art and will not be described in detail herein. The first bus 110 also connects to other components (not shown) in a computer system, such as, for example, a peripheral controller which can be a source of data to the first bus 110.

The interface is also connected to a second bus 120, which, in the embodiment described herein, is preferably a high speed processor bus, such as, for example, a P6 bus. In the preferred embodiment, the second bus 120 is a 64-bit bus defined to communicate with an INTEL P6 microprocessor and operates asynchronously with respect to the first bus 110. For example, the second bus 120 may advantageously operate at 50 MHz, 60 MHz, or some other frequency in accordance with the clock frequency of a P6 microprocessor coupled to the second bus 120. Although described herein in accordance with the second bus 120, other processor buses which operate asynchronously with respect to the first bus 110 may also be used. The particular characteristics of the second bus 120 are not pertinent to the present invention other than that the data transfers on the second bus 120 occur asynchronously with respect to the data transfers on the first bus 110. The second bus 120 also includes a plurality of data lines 122, a plurality of address lines (not shown), a plurality of control lines 124, and a BUS2 CLK line 126.

Because of the asynchronous relationship between the first bus 110 and the second bus 120, the interface 100 further includes a data buffer 130 which receives data from the first bus 110 via the data lines 112 and under control of the first bus control signals on the line 114 and the clock signal on the BUS1 CLK line 116. The data buffer 130 buffers the data and provides the buffered data to the second bus 120 under control of the control signals on the control lines 124 from the second bus 120 and in synchronism with the clock signal on the BUS2 CLK line 126.

The data buffer 130 comprises a plurality of storage locations 132. In the embodiment of FIG. 1, only four storage locations 132, labeled DATABUF0, DATABUF1, DATABUF2 and DATABUF3, are shown. It should be understood from the following description that additional storage locations can be included to provide additional storage of data between the two buses. For example, in one particularly preferred embodiment, eight storage locations are included. The invention can readily be understood in view of the four storage locations shown. Each of the storage locations 132 stores 64 data signals. The inputs of the storage locations 132 are commonly connected to the BUS1 DATA lines 112. The outputs of the storage locations 132 are provided as inputs to a 64-bit wide 4:1 multiplexer (MUX) 134. Again, when additional storage locations (e.g., eight) storage locations are provide, the multiplexer 134 is expanded to provide additional sets of inputs accordingly (e.g., the multiplexer 134 would be an 8:1 multiplexer in such an embodiment). The multiplexer 134 is controlled by a bus 2 interface state machine 140 via a pair of select lines 142. In particular, the bus 2 interface state machine maintains an output pointer which points to the next higher numbered storage location after the storage location from which the previous data were transferred to the second bus 120. It should be understood that the output pointer is a modulo-4 output pointer which counts 0, 1, 2 3, 0 such that the output pointer points to the DATABUF0 storage location following the DATABUF3 storage location.

In response to the output pointer value on the select lines 142, the multiplexer 134 selects the data from one of the four storage locations 132 as the source of output data to communicate to the second bus 120, assuming that the data in the selected storage location is valid, as will be discussed below. The selected data are registered in a 64-bit wide register 150 which is clocked by the BUS2 CLK signal on the line 126 so that the data are synchronized with the second bus 120. The register 150 is further controlled by an enable input signal on an enable line 152. When the enable line 152 is inactive, the data outputs of the register 150 are inactive regardless of the data registered in the register 150. When the enable line 152 is active, the register 150 outputs the registered data onto the second bus 120 via the plurality of BUS2 DATA lines 122. The enable line 152 is controlled by the bus 2 interface state machine 140 to enable the register 150 only when the interface 100 is selected to transfer data to the second bus 120.

Data from the first bus 110 are stored in the data buffer 130 under control of a bus 1 interface state machine 160. The bus 1 interface state machine 160 receives the control signals and the BUS1 CLK signal from the first bus 110 via the control lines 114 and the BUS1 CLK line 116. The bus 1 interface state machine 160 is responsive to a data ready control signal communicated by the control lines 114 to generate a selected data strobe to the data storage locations 132 via one of eight data strobe lines 164. (Two data strobe lines are provided for each data storage location 132 in the preferred embodiment to strobe 32 bits of data from the first bus 110 into respective upper and lower portions of each data storage location 132.) The data strobe lines 164 operate as clock signals to the data storage locations 132 such that the data on the BUS1 DATA lines 112 are stored in a selected one of the data storage locations 132 corresponding to the active one of the data strobe lines 164. The bus 1 interface state machine 160 operates in a conventional manner to control the data buffer 130 as a circular FIFO (first-in/first-out) buffer. That is, the bus 1 interface state machine 160 maintains an input pointer to a current one of the input locations 132 which is the next available empty storage location in the data buffer 130. When data are written into the selected storage location 132, the input pointer is incremented to the next higher number. The input pointer is a modulo-4 pointer (in the described embodiment having four storage locations) such that when the input pointer is incremented from a value of 3, it changes to 0. Hence the data buffer 130 can be considered to be "circular" buffer with DATABUF0 adjacent to DATABUF3.

The bus 1 interface state machine 160 outputs a plurality of flag set signals on a set of lines 166 which are provided as inputs to respective set inputs (S) of a flag buffer 170 which comprises a plurality (e.g., four) of data valid flag buffer locations. As described in more detail below in connection with FIG. 2, the flag set signals are synchronized with the BUS1 CLK signal on the signal line 116 which are provided as respective first clock inputs to each of the flag storage cells in the flag buffer 170.

The flag buffer 170 stores four valid data flags (FLAG0, FLAG1, FLAG2 and FLAG3) with one valid data flag corresponding to each of the buffer locations (DATABUF0 ... DATABUF3) 132 in the data buffer 130. An inactive data valid flag indicates that the corresponding buffer location 132 is empty and that data can be stored in that buffer location 132. An active data valid flag indicates that the corresponding buffer location 132 has valid data stored therein and that further data cannot be stored in that buffer location. An active data valid flag also indicates to a BUS2 interface state machine (discussed below) that the data in the corresponding buffer location is ready to be transferred to the second bus 120. A data valid flag is set when data are stored in the respective data buffer location. A data valid flag is cleared when data are transferred from the respective data buffer location to the second bus 120.

The valid data flags in the flag buffer 170 are provided via a set of valid data flag lines 172 as inputs to a first 4:1 flag multiplexer (MUX) 180. The first flag multiplexer 180 is controlled by a pair of bus 1 select lines 182 from the bus 1 interface state machine 160. The bus 1 interface state machine 160 controls the pair of bus 1 select lines 182 to encode the current value of the input pointer. Thus, the first flag multiplexer 180 selects the data valid flag corresponding the data storage location to which the input pointer is currently pointing so that the output of the multiplexer 180 is a data valid flag which indicates whether the data in the current input location is already valid. That is, the selected data valid flag indicates whether the data previously stored in the selected data buffer location has already been transferred to the second bus 120 (the data valid flag will be "invalid") or whether the data previously stored in the selected data buffer location has not yet been transferred to the second bus 120 (the data valid flag will still be "valid").

The data valid flags in the flag buffer 170 are resettable to a known state (e.g., all the data valid flags inactive) via a SYSTEM RESET signal on a line 174. The SYSTEM RESET signal is a conventional reset signal which is generated when power to the computer system is turned on, when the computer system is reset by the user, or the like.

The output of the first flag multiplexer 180 is provided as a data input to a bus 1 valid data synchronizer 190 comprising a first bus 1 synchronizer flip-flop 192. A data output of the first bus 1 synchronizer flip-flop 192 is provided as a data input to a second bus 1 synchronizer flip-flop 194. The two bus 1 synchronizer flip-flops 192, 194 are clocked by the BUS1 CLK signal on the clock line 116. A data output of the second bus 1 synchronizer flip-flop 194 is provided as an input to the bus 1 interface state machine 160 via a DATA VALID 1 data line 196. Thus, the selected valid flag is provided as feedback to the bus 1 interface state machine to indicate whether the data storage location currently selected by the input pointer in the state machine is available for storage of new data or whether new data cannot be accepted. It should be understood that other types of data synchronizers can also be used.

The valid data flags in the flag buffer 170 are provided via the set of valid data flag lines 172 as inputs to a second 4:1 flag multiplexer (MUX) 200. The second flag multiplexer 200 is controlled by a pair of bus 2 select lines 202 from the bus 2 interface state machine 140. The bus 2 select lines 202 are controlled to correspond to the output pointer lines 142 which select the data storage location 132 in the data buffer 130 as the source of data to be output to the second bus 120. Thus, the output of the second flag multiplexer 200 indicates whether the currently selected data storage location has valid data or whether the data in that location have already been transferred and are no longer valid.

The output of the second flag multiplexer 200 is provided as a data input to a bus 2 valid data synchronizer 210 comprising a first bus 2 synchronizer flip-flop 212. A data output of the first bus 2 synchronizer flip-flop 212 is provided as a data input to a second bus 2 synchronizer flip-flop 214. The two bus 2 synchronizer flip-flops 212, 214 are clocked by the BUS2 CLK signal on the clock line 126. An output of the second bus 2 synchronizer flip-flop 214 is provided as an input to the bus 2 interface state machine 140 via a DATA VALID 2 data line 216. Thus, the bus 2 interface state machine 140 is provided with feedback as to the validity of the data in the data storage location to which the output pointer is currently pointing.

The data valid buffer locations (i.e., FLAG0, FLAG1, FLAG2 and FLAG3) in the flag buffer 170 are selectively cleared by four flag clear lines 220 which are generated by the bus 2 interface state machine 140. Each of the flag clear lines 220 is provided as a respective flag clear input (C) to one of the data valid buffer locations in synchronism with the BUS2 CLK on the signal line 126. The respective flag clear line is activated when data from the respective storage location in the data buffer 130 are transferred to the second bus 120. For example, when the bus 2 interface state machine 140 selects the data in the DATABUF2 storage location in the data buffer 130 as the output data to the second bus 120, the bus 2 interface state machine 140 activates the corresponding one of the flag clear lines 220 provided as the clear (C) input to the FLAG2 data valid buffer location. The FLAG2 data valid buffer location is cleared in synchronism with the BUS2 CLK on the signal line 126.

Figure 2:
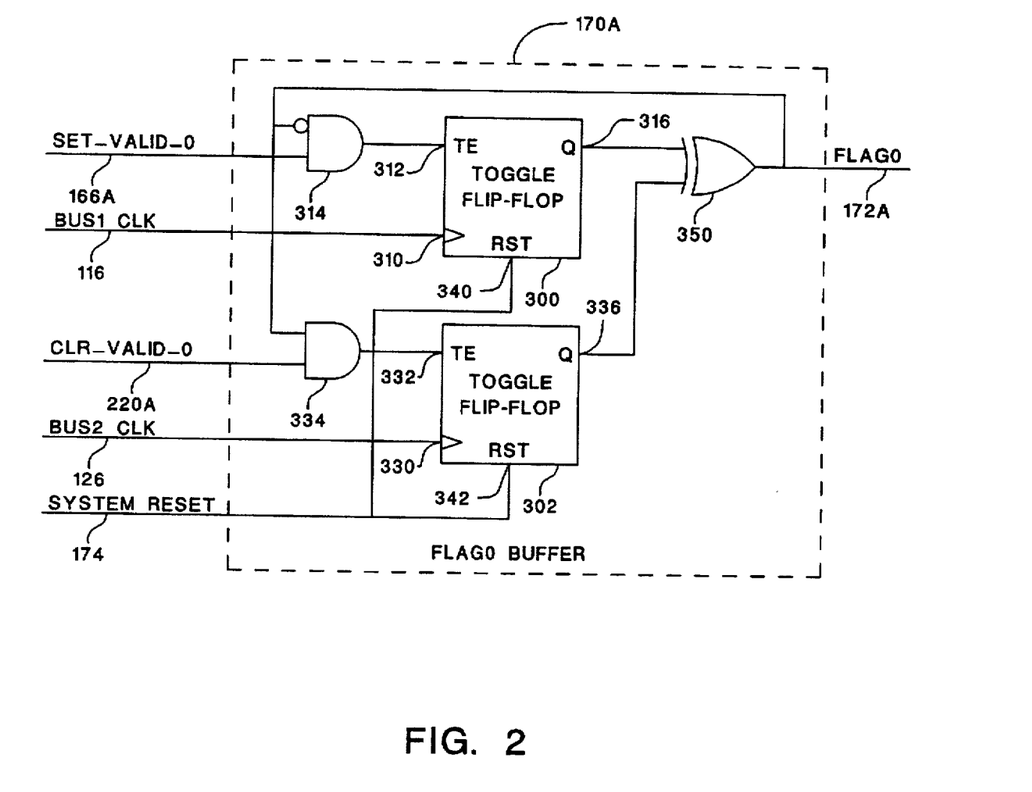
FIG. 2 illustrates a preferred embodiment of a data valid flag buffer for use in the interface of FIG. 1.

FIG. 2 illustrates a preferred embodiment of one of the data valid storage locations 170 in FIG. 1. In particular, FIG. 2 illustrates the FLAG0 data valid storage location 170A. The other three data valid storage locations for FLAG1, FLAG2 and FLAG3 are preferably identical to the FLAG0 data valid storage location. As illustrated, the data valid storage location 170 comprises a first toggle flip-flop 300 and a second toggle flip-flop 302.

The first toggle flip-flop 300 has a clock input 310 which receives the BUS1 CLK signal on the signal line 116. The first toggle flip-flop 300 has a toggle enable (TE) input 312 which receives an output of a first two-input AND gate 314. The first AND gate 314 has an first, active high, input which receives a SET_VALID_0 signal on a signal line 166A (one of the set valid data flag lines 166 of FIG. 1) from the bus 1 interface state machine 160. The first AND gate 314 has a second, active low, input which receives the FLAG0 data valid flag as feedback on a signal line 172A (which is one of the signal lines 172 in FIG. 1). The first toggle flip-flop 300 has a Q output 316 which changes state (i.e., from a low logic level to a high logic level or from a high logic level to a low logic level) on a low-to-high transition of the BUS1 CLK signal in the preferred embodiment. The Q output signal of the first toggle flip-flop 300 only changes when the SET_VALID_0 signal on the signal line 166A is active at the same time as the FLAG0 data valid flag is inactive. When the SET_VALID_0 signal is active and the FLAG0 data valid flag is inactive, the output of the AND gate 314 is active, and the Q output of the first toggle flip-flop 300 will change from its high state to its low state or from its low state to its high state one time for each low-to-high transition of the BUS1 CLK signal. If either the SET_VALID_0 signal is inactive or the FLAG0 data valid flag is active, the Q output of the first toggle flip-flop 300 will not change irrespective of the changes on the BUS1 CLK signal.

The second toggle flip-flop 302 has a clock input 330 which receives the BUS2 CLK signal on the signal line 126. The second toggle flip-flop 302 has a toggle enable (TE) input 332 which receives an output of a second two-input AND gate 334. The second AND gate 334 has an first, active high, input which receives a CLR_VALID_0 signal on a signal line 220A (one of the clear valid data flag lines 220 of FIG. 1) from the bus 2 interface state machine 140. The second AND gate 334 has a second, active high, input which receives the FLAG0 data valid flag as feedback on the signal line 172A. The second toggle flip-flop 302 has a Q output 336 which changes state (i.e., from a low logic level to a high logic level or from a high logic level to a low logic level) on a low-to-high transition of the BUS2 CLK signal in the preferred embodiment. The Q output signal of the second toggle flip-flop 302 only changes when the CLR_VALID_0 signal on the signal line 220A is active at the same time as the FLAG0 data valid flag is active. When the CLR_VALID_0 signal is active and the FLAG0 data valid flag is active, the output of the AND gate 334 is active, and the Q output of the second toggle flip-flop 302 will change from its high state to its low state or from its low state to its high state one time for each low-to-high transition of the BUS2 CLK signal. If either the CLR_VALID_0 signal is inactive or the FLAG0 data valid flag is inactive, the Q output of the second toggle flip-flop 302 will not change irrespective of the changes on the BUS2 CLK signal.

The first toggle flip-flop 300 has a reset (RST) input 340 and the second toggle flip-flop 302 has a reset (RST) input 342. The RST inputs 340, 342 receive the SYSTEM RESET signal on the signal line 174. When the SYSTEM RESET signal is active, the two toggle flip-flops 300, 302 are reset so that the respective Q outputs are cleared to their inactive low states.

The Q outputs of the first and second toggle flip-flops 300, 302 are provided as respective first and second inputs to an exclusive-OR gate 350. An output of the exclusive-OR gate 350 provides the FLAG0 data valid flag on the line 172A which is thus the output of the FLAG0 data valid storage location. The FLAG0 data valid flag on the line 172A is also provided as the feedback to the two toggle flip-flops 300, 302 via the respective AND gates 314, 334, as discussed above. The exclusive-OR gate 350 operates in response to the two inputs to provide an active FLAG0 data valid flag on the line 172A when the two Q outputs differ from each other (i.e., one Q output is active high and the other Q output is active low) and to provide an inactive FLAG0 data valid flag on the line 172A when the two Q outputs have the same logic level (i.e., both Q outputs active high or both Q outputs active low). As discussed above, when the output of the exclusive-OR gate 350 is active high indicating that the Q output of the second toggle flip-flop 302 is different from the Q output of the first toggle flip-flop 300, only the second AND gate 334 is potentially enabled such that if the CLR_VALID_0 signal line 220A is active, the second toggle flip-flop 302 is enabled. The second toggle flip-flop 302 toggles on the next low-to-high transition of the BUS2 CLK signal on the signal line 126. This causes the Q output of the second toggle flip-flop 302 to become the same as the Q output of the first toggle flip-flop 300 so that the output of the exclusive-OR gate 350 becomes inactive. The inactive state of the output of the exclusive-OR gate 350 indicates that the FLAG0 data valid flag is cleared (i.e., the data are invalid). In addition, the second toggle flip-flop 302 is disabled from toggling, and the first toggle flip-flop 300 is enabled to toggle if the SET_VALID_0 signal line 166A is activated by the bus 1 interface state machine 160. It can therefore been seen that the FLAG0 valid data flag is synchronously set with respect to the BUS1 CLK signal and is synchronously cleared with respect to the BUS2 CLK signal.

Additional information regarding the toggle flip-flop based data storage locations described above can be found, for example, in U.S. Pat. No. 5,083,049, which is assigned to the assignee of the present application, and which is incorporated by reference herein. One skilled in the art will appreciate that alternative data valid storage locations can be used in connection with the present invention.

Referring again to FIG. 1, it can be seen that the purposes of the bus 1 valid data synchronizer 190 and the bus 2 valid data synchronizer 210 are to assure that the changes in the valid data flags are provided to the bus 1 interface state machine 160 and the bus 2 interface state machine 140 in synchronism with the respective clocks which control the two state machines. In particular, as discussed above, the valid data flags are set in synchronism with the BUS1 CLK signal and are cleared in synchronism with the BUS2 CLK. Thus, a valid data flag will change from its inactive state to its active state in synchronism with the BUS1 CLK signal and will change from its active state to its inactive state in synchronism with the BUS2 CLK. Because the BUS1 CLK signal is asynchronous with the BUS2 CLK signal, the bus 1 interface state machine 160 receives the active-to-inactive transitions of the data valid flags asynchronously with respect its internal state transitions. Thus, there are possibilities that the transitions will occur while the bus 1 interface state machine requires the state of the valid data flags to be stable and unchanging. The bus 1 synchronizer 190 synchronizes the high-to-low transitions of the valid data flags to the BUS1 CLK and thus to the internal state transitions of the bus 1 interface state machine 160. Similarly, the bus 2 synchronizer 210 synchronizes the low-to-high transitions of the valid data flags to the BUS2 CLK and thus to the internal transitions of the bus 2 interface state machine 140. It is particularly important that the low-to-high transitions of the valid data flags be synchronized with the BUS2 CLK because, the respective valid data flag is set as the data are being written into the currently selected input location. If the currently selected input location is also the currently selected output location (i.e., the bus 2 interface state machine 140 has output all previously stored data), the bus 2 interface state machine 140 will immediately sense that the valid data flag has become active and will output the data to the second bus 120. However, this potentially causes metastability within the bus 2 interface state machine 140 and a race condition, particularly if the valid data flag transitions from its inactive state to its active state before the data have become stored in the respective data storage location and have propagated through the multiplexer 134 and through the register 150. The bus 2 synchronizer assures that the data are stable before the bus 2 interface state machine 140 outputs the data to the second bus 120.

The bus 1 to bus 2 interface 100 of FIG. 1 works well for its intended purpose; however, the interface 100 includes a synchronization delay caused by the bus 1 synchronizer 190 and the bus 2 synchronizer 210 which reduces the overall data rate of the interface 100, particularly when data are being transferred to or from the interface 100 in a burst mode. The problem can be understood by considering the operation of the bus 2 interface state machine 140 when all four data buffer locations (DATABUF0 ... DATABUF3) in the data buffer 130 are full and the corresponding valid data flags (FLAG0 ... FLAG3) are set. After the bus 2 interface state machine 140 transfers the data from the first data buffer location (e.g., DATABUF0), the bus 2 interface state machine 140 selects the next buffer location (e.g., DATABUF1) via the multiplexer 134 and also selects the next valid data flag (e.g., FLAG1) via the select lines 202 to the second flag multiplexer 200. Although the data in the second buffer location (DATABUF1) may have been stable for a large number of clock cycles, the bus 2 interface state machine 140 must still wait for the valid data flag to be synchronized by the bus 2 synchronizer 210 before it can output the data to the second bus 120. Thus, two unnecessary cycles of the BUS2 CLK signal are interposed to synchronize the valid data flag.

A similar unnecessary delay is interposed when the bus 1 interface state machine increments the input pointer to the next location. Although the next data storage location may have been empty for a large number of clock cycles, when the bus 1 interface state machine changes the select lines 182 to the first flag multiplexer 180, the bus 1 interface state machine must wait two clock cycles for the selected flag to be synchronized via the bus 1 synchronizer 180 before it can determine that the valid data flag is cleared and that the data storage location is therefore available.

Figure 3:
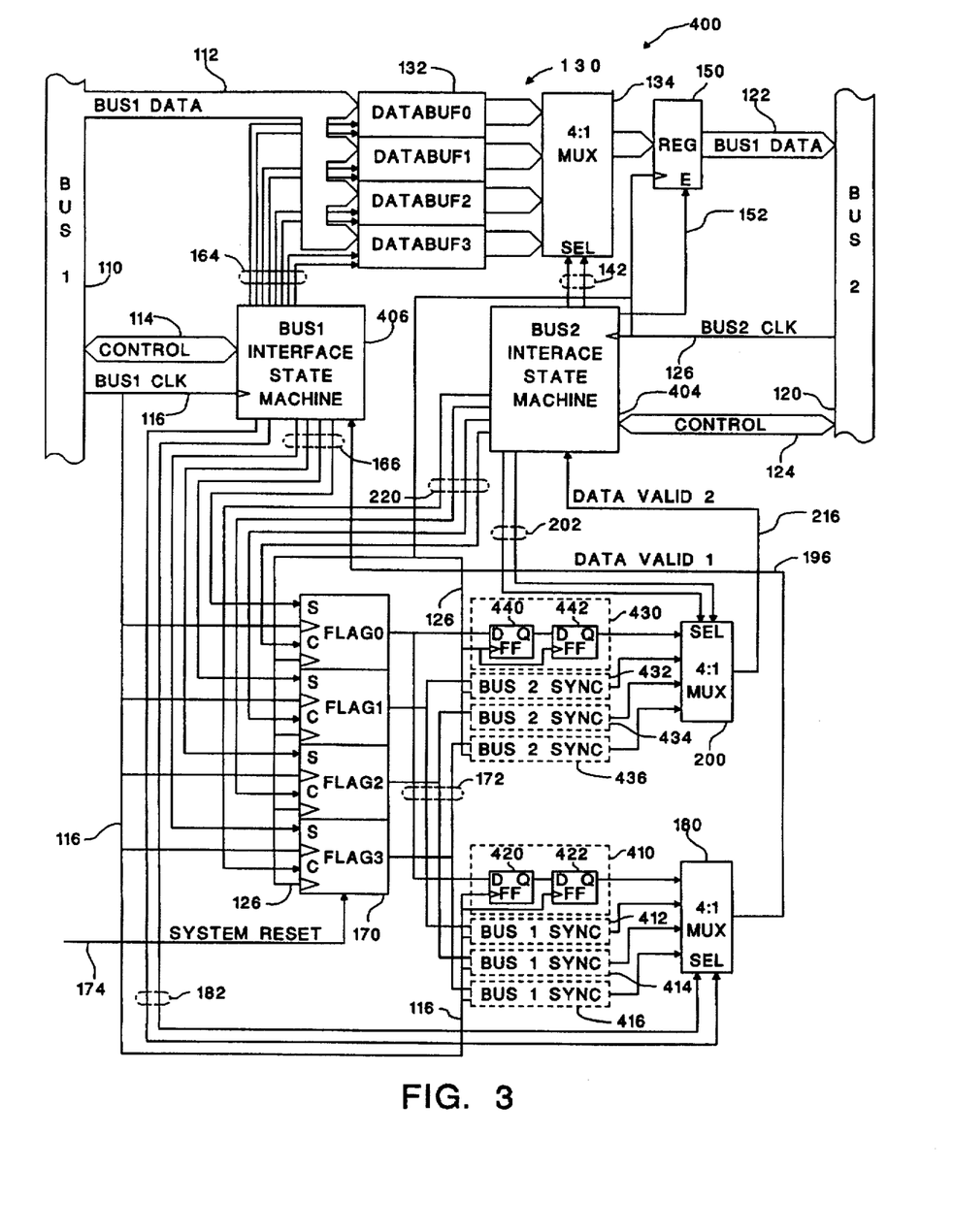
FIG. 3 illustrates an exemplary interface between the two synchronous buses of FIG. 1 wherein the interface incorporates the improved synchronization circuit of the present invention.

Applicant has discovered that the unnecessary delay can be avoided by synchronizing the valid data flags prior to applying the valid data flags to the bus 2 flag multiplexer 200. An improved interface 400 is illustrated in FIG. 3 wherein like numbers indicate like elements as described above in connection with FIG. 1. The bus 2 interface state machine 140 is modified and is shown as a bus 2 interface state machine 404 in FIG. 3. Similarly, the bus 1 interface state machine 160 is modified and is shown as a bus 1 interface state machine 406 in FIG. 3

As illustrated in FIG. 3, the single bus 1 synchronizer 190 on the output of the first flag multiplexer 180 of FIG. 1 has been replaced with four bus 1 synchronizers 410, 412, 414 and 416. Each bus 1 synchronizer 410, 412, 414, 416 has its respective input connected to the output of a respective one of the four data valid flag buffer locations 170 and has its respective output connected to one of the four inputs of the first flag multiplexer 180. As further illustrated for the first bus 1 synchronizer 410, each of the synchronizers comprises a pair of flip-flops 420, 422 connected in tandem and clocked by the BUS1 CLK signal on the signal line 116.

Similarly, the single bus 2 synchronizer 210 has been replaced with four bus 2 synchronizers 430, 432, 434 and 436. Each bus 2 synchronizer 430, 432, 434, 436 has its respective input connected to the output of a respective one of the four data valid flag buffer locations 170 and has its respective output connected to one of the four inputs of the second flag multiplexer 200. As further illustrated for the first bus 2 synchronizer 430, each of the synchronizers comprises a pair of flip-flops 440, 442 connected in tandem and clocked by the BUS2 CLK signal on the signal line 126.

It can be seen that the improved interface 400 accomplishes the goal of the interface 100 of FIG. 1 by assuring that the data valid flags are properly synchronized with the bus 1 interface state machine 406 and with the bus 2 interface state machine 404. For example, if the bus 2 interface state machine 404 has output all the data in the data buffer 130 and is waiting for the next data to be stored in a storage location 132, the input pointer and the output pointer will point to the same storage location 132. When the bus 1 interface state machine sets the valid data flag (e.g., FLAG0), the output of the FLAG0 flag buffer 170A (FIG. 2) will transition to its active state and will propagate through the first bus 2 synchronizer 430 and become synchronized with the bus 2 interface state machine 404 before it is applied as an active input to the bus 2 interface state machine 404. Thus, the active output of the FLAG0 flag buffer 170A will necessarily be synchronized to the bus 2 clock and thus synchronized to the bus 2 interface state machine 404. The active output of the FLAG0 flag buffer 170A will be delayed to provide the requisite time to allow the data that was just stored in the DATABUF0 data storage location 132 to stabilize. On the other hand, if the bus 2 interface state machine is outputting a burst of data from the data buffer 130 wherein the next buffer location 132 to be selected has had the data stored therein for a number of clock cycles, then the data valid flag (e.g., FLAG1) will have already propagated through the respective bus 2 synchronizer (e.g., the second bus 2 synchronizer 432) and will be active at the input of the second flag multiplexer 200. Thus, when the bus 2 interface state machine changes the select lines 202 to select the output of the FLAG1 data valid flag buffer, the active state of the flag will be provided immediately to the bus 2 interface state machine 404 without any further delay.

Figure 4:
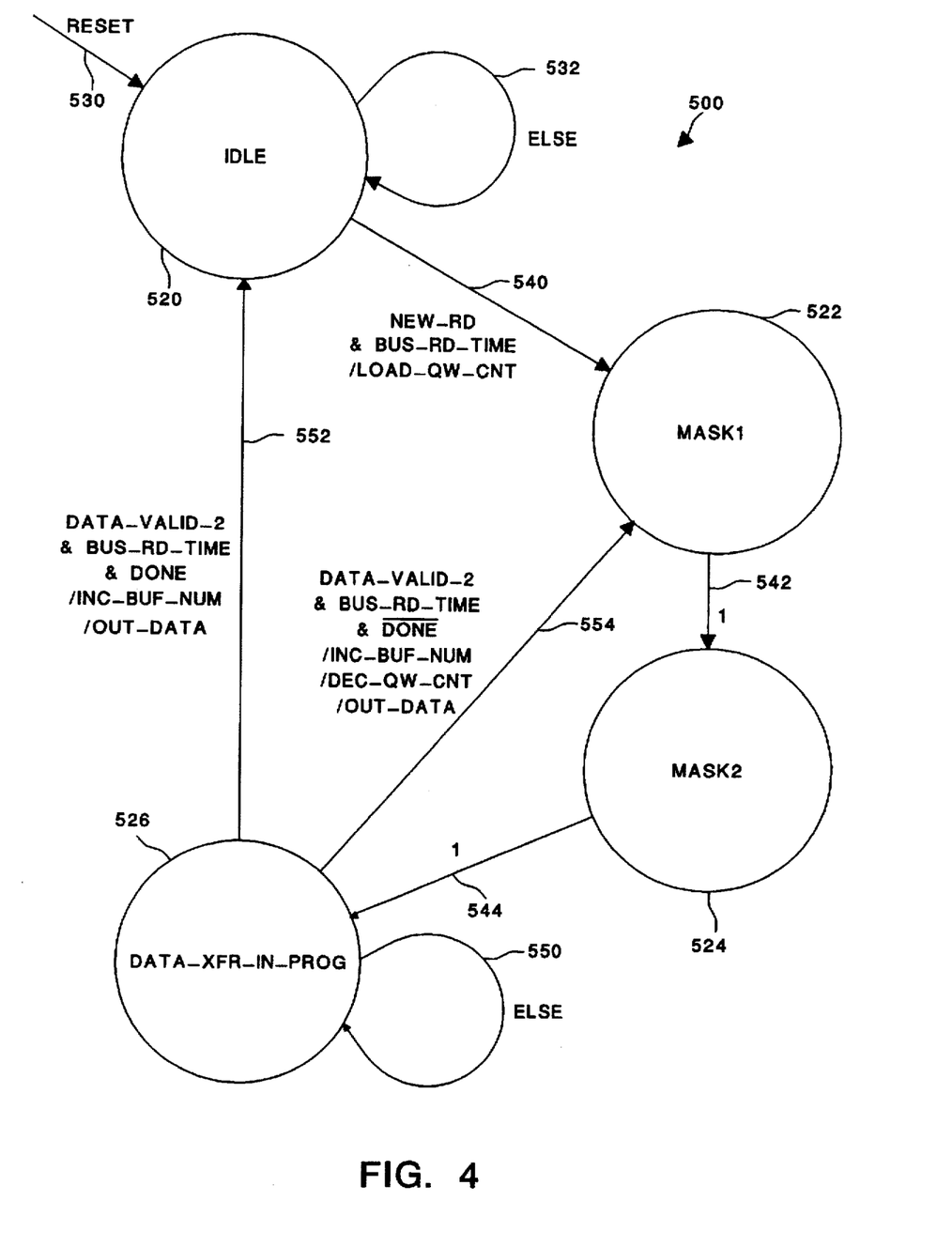
FIG. 4 illustrates an exemplary state diagram for the pertinent portion of the bus 2 interface state machine of FIG. 1.
Figure 5:
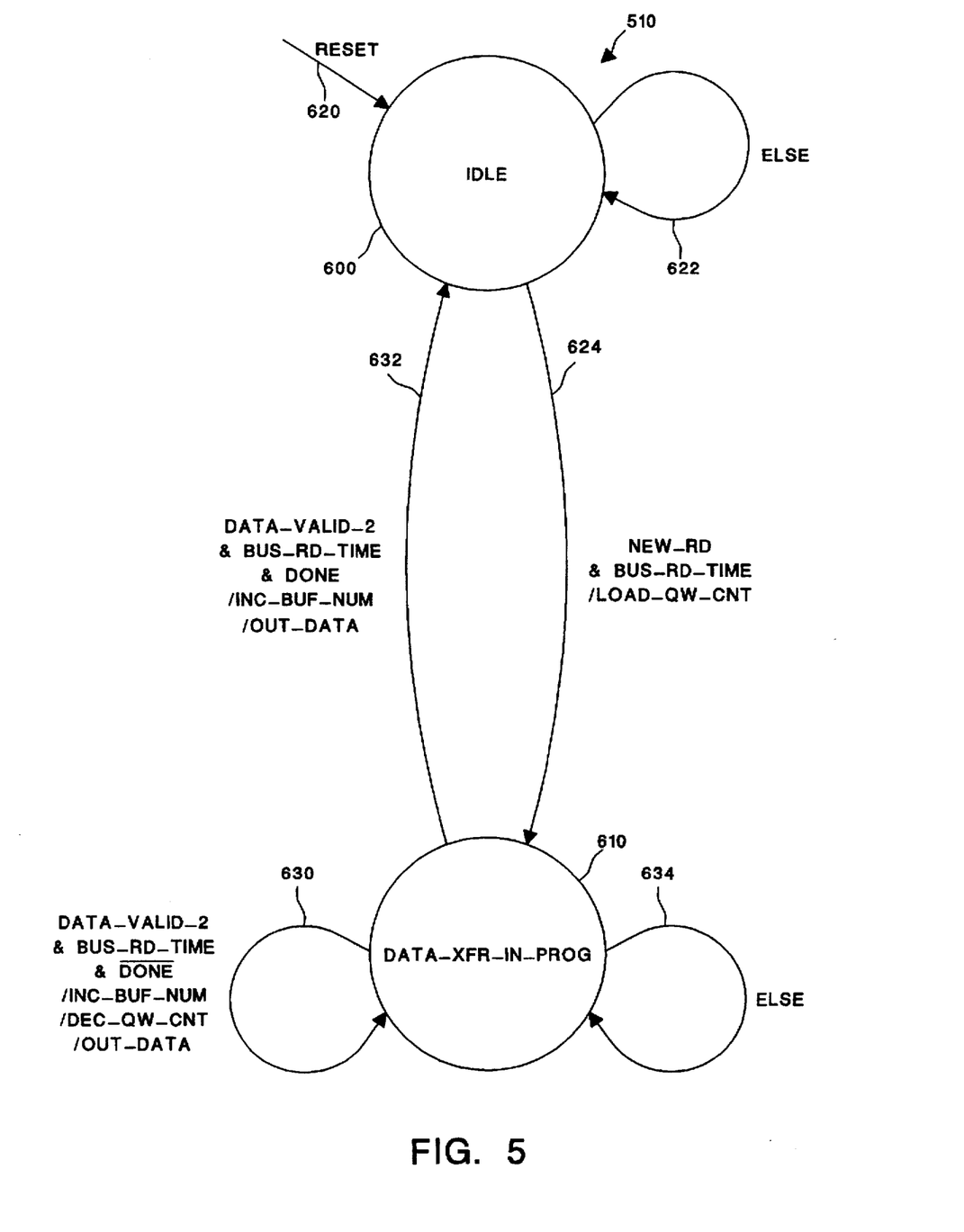
FIG. 5 illustrates an exemplary state diagram for the pertinent portion of the bus 2 interface state machine of FIG. 3.

To assist in further understanding the benefits of the improved interface of FIG. 3, FIG. 4 illustrates an exemplary state diagram 500 of a pertinent portion of the bus 2 interface state machine 140 of FIG. 1, and FIG. 5 illustrates an exemplary state diagram 510 of a pertinent portion of the bus 2 interface state machine 404 of FIG. 3. Each state machine 140, 404 includes additional functions not illustrated in FIGS. 4 and 5 which are not pertinent to the present invention and which will not be described herein. In FIGS. 4 and 5, the pertinent internal states of the state machine are represented in a conventional maimer as circles having the state name therein. The lines connecting the circles represent state transitions from one state to another state or from a state back to itself which occur in synchronism with the BUS2 CLK signal 126 of FIGS. 1 and 2.

The conditions precedent to the state transition are identified as parameters positioned adjacent to each state transition with an ampersand ("&") representing an AND requirement meaning that all the conditions coupled by the ampersands must be satisfied in order to cause the state transition to occur. A line over a condition indicates that the condition must be inactive. A "1" adjacent to a state transition indicates that the transition from one state to the next will occur unconditionally on occurrence of the next cycle of the BUS2 CLK signal. An "ELSE" beside a state transition indicates that the state transition is the default transition which occurs if the conditions for other transitions from a given state are not satisfied. If the bus 2 interface state machine 140 performs a pertinent operation on occurrence of a particular transition, each operation is identified at the end of the parameter by a slash ("/") followed by the name of the operation.

As illustrated in FIG. 4, the state diagram 500 includes an IDLE state 520, a MASK1 state 522, a MASK2 state 524 and a DATA_XFR_IN_PROG (data transfer in progress) state 526. The state diagram 500 illustrates the progress of a transfer of multiple quad words of data from the data buffer 132 to the second bus 120. The IDLE state 520 is the "normal" state of the bus 2 interface state machine 140 which is entered when the computer system is reset, as illustrated by a RESET state transition 530. As will be discussed below, the bus 2 interface state machine 140 returns to the IDLE state 520 when a data transfer is completed.

The bus 2 interface state machine 140 remains in the IDLE state 520 as long as a new read cycle is not initiated by other portions of the bus 2 interface state machine 140 which monitor control signals on the second bus 120 and other conditions to determine when a new read cycle has been initiated. The operation of the bus 2 interface state machine 140 in remaining in the IDLE state until a new read cycle is initiated is represented by an ELSE state transition 532 wherein this portion of the bus 2 state machine 140 monitors the other portions of the bus 2 interface state machine 140 and determines when a new read cycle has been initiated. In particular, the bus 2 interface state machine 140 remains in the IDLE state 520 while the internal NEW_RD signal is inactive.

When a new read cycle has been initiated by the bus 2 interface state machine 140 (NEW_RD is active) and the bus 2 interface state machine 140 has determined that the second bus 120 has been allocated to the bus interface 100 (a signal designated as BUS_RD_TIME being active), then the bus 2 interface state machine 140 makes a state transition 540 to the MASK1 state 522. As further illustrated by the "/LOAD_QW_CNT" portion of the state transition parameter, the bus 2 interface state machine will load the quad word count into an internal quad word counter (not shown) as the state transition 540 is occurring. The quad word count indicates the number of transfers that must occur in order to transfer a given burst of data from the first bus 110 to the second bus 120.

The MASK1 state 522 and the MASK2 state 524 are delay states to assure that a selected data valid flag has had sufficient time to propagate from the bus 2 flag multiplexer 200 through the bus 2 synchronizer 210 before the bus 2 interface state machine 140 checks the state of the selected data valid flag. Thus, a transition 542 from the MASK1 state 522 to the MASK2 state 524 is shown as occurring unconditionally (as represented by the adjacent "1" parameter. Similarly, a transition 544 from the MASK2 state 524 to the DATA_XFR_IN_PROG state 526 occurs unconditionally.

In the DATA_XFR_IN_PROG state 526, the bus 2 interface state machine 140 checks the state of the DATA_VALID_2 flag, and, if it is not active, the bus 2 interface state machine remains in the DATA_XFR_IN PROG state 526 as illustrated by an ELSE transition 550. Otherwise, if the DATA_VALID_2 flag is active and BUS_RD_TIME is active, the bus 2 interface state machine 140 will transition either to the IDLE state 520 or the MASK1 state 522 via a transition 552 or a transition 554, respectively, and will output the data in the currently selected one of the buffer locations 132. This is illustrated by the /OUT_DATA parameter on both transitions 552 and 554. It should be understood that in addition to outputting the data, the bus 2 interface state machine will activate the CLR_VALID signal to the corresponding one of the flag buffers 170.

The selection of the transition 552 or the transition 554 depends on the condition of the DONE parameter. The DONE parameter represents the condition of the QW_CNT output of the quad word counter. If QW_CNT is zero, DONE will be active. If QW_CNT has a non-zero value, then DONE will be inactive (i.e., $\overline{\text{DONE}}$ will be active). If DONE is active, the bus 2 interface state machine 140 will make the transition 552 back to the IDLE state 520 and will increment the pointer to the current output buffer location, as indicated by the parameter /INC_BUF_NUM, to point to the next buffer location 132 as the next output buffer. Otherwise if DONE is inactive (i.e., $\overline{\text{DONE}}$ is active) the bus 2 interface state machine 140 will make the transition to the MASK1 state 522, will increment the pointer to the current output buffer location, and will decrement the quad word counter, as indicated by the /DEC_QW_CNT parameter. As discussed above in connection with FIG. 1, it is necessary to cycle back through the MASK1 state 522 and the MASK2 state 524 in order to provide time for the previously selected data valid flag to propagate out of the bus 2 synchronizer and be replaced by the newly selected data valid flag before the DATA_VALID_2 signal line 216 at the input to the bus 2 interface state machine 140 before the DATA_VALID_2 signal is evaluated by the bus 2 interface state machine 140. This delay will be interposed regardless of how long the data at the newly selected output buffer location has been stored in the selected data buffer location 132 and how long the correspond data valid flag has been active.

In contrast to the state diagram 500 of FIG. 4, the state diagram 510 of FIG. 5 requires fewer states and operates more efficiently because of the positioning of the multiple bus 2 synchronizers 430, 432, 434 and 436 between the outputs of the flag buffer 170 and the inputs to the bus 2 flag multiplexer 200 as shown in FIG. 3 rather than having only a single bus 2 synchronizer 210 as illustrated after the multiplexer 200, as illustrated in FIG. 1. In particular, the state diagram 510 of FIG. 5 includes only an IDLE state 600 and a DATA_XFR_IN_PROG state 610. The IDLE state is entered by a RESET transition 620, as discussed above. The bus 2 interface state machine 404 of FIG. 3 will remain in the IDLE state 600, as illustrated by an ELSE transition 622 unless certain conditions are met as illustrated by the parameters adjacent to a transition 624 to the DATA_XFR_IN_PROG state 610. In particular, the bus 2 interface state machine 404 will remain in the IDLE state until a NEW_RD is initiated and the BUS_RD_TIME condition is active, at which time it will transition via the state transition 624 to the DATA_XFR_IN_PROG state 610 and will load the quad word counter with the number of quad words to transfer, as represented by the /LOAD_QW_CNT parameter.

In the DATA_XFR_IN_PROG state 610, the bus 2 interface state machine 404 monitors the condition of the DATA_VALID_2 signal. If the DATA_VALID_2 signal is active and BUS_RD_TIME remains active, the bus 2 interface state machine 404 will perform one of two state transitions 630 and 632 in accordance with the DONE condition. If the DONE condition is inactive, then the bus 2 interface state machine 404 will remain in the DATA_XFR_IN_PROG state 610, as illustrated by the state transition 630 and will output the contents of the currently selected one of the data buffer locations 132, as illustrated by the /OUT_DATA parameter. The bus 2 interface state machine 404 will increment the current buffer number (/INC_BUF_NUM) and will decrement the quad word counter (/DEC_QW_CNT). If the DONE condition is active, then the bus 2 interface state machine 404 will transition back to the IDLE state 600 via the state transition 632 while outputting the last quad word (/OUT_DATA) and while incrementing the buffer number (/INC_BUF_NUM). If the DATA_VALID_2 signal is not active or if the BUS_RD_TIME condition is not met (e.g., the second bus 120 is not currently available), then the bus 2 interface state machine 404 remains in the DATA_XFR_IN_PROG state 610 as illustrated by an ELSE transition 634.

As illustrated by the state diagram 510, the bus 2 interface state machine 404 in accordance with FIGS. 3 and 5 does not have the time delay inherent in the bus 2 interface state machine 140 of FIGS. 1 and 4. In particular, it can be seen that as soon as the bus 2 interface state machine 404 increments the buffer number at the state transition 630, it stays in the DATA_XFR_IN_PROG state 610 and immediately checks the DATA_VALID_2 signal to determine if the data can be output from the newly selected buffer location 132. This can occur because the corresponding data valid flag (FLAG0, FLAG1, FLAG2 or FLAG3) will have propagated through the respective bus 2 synchronizer 430, 432, 434 or 436 and will be available at the input to the flag multiplexer 200 as soon as the next input of the flag multiplexer 200 is selected. Thus, assuming that the second bus 120 remains allocated to the bus 2 interface state machine 404, and assuming that the first bus 110 has filled the data buffer locations 132, then the data can be output from the buffer locations 132 on each succeeding clock cycle rather than having to interpose a two clock cycle delay between each output.

Although described above in connection with particular embodiments of the present invention, it should be understood the descriptions of the embodiments are illustrative of the invention and are not intended to be limiting. Various modifications and applications may occur to those skilled in the art without departing from the true spirit and scope of the invention as defined in the appended claims.

What is claimed is:

1. An interface circuit between first and second buses which operate asynchronously with respect to each other, wherein said first bus provides data to said interface circuit in synchronism with a first bus clock and wherein said second bus receives data from said interface circuit in synchronism with a second bus clock, said apparatus comprising:

an input/output buffer comprising at least first and second buffer locations into which data from said first bus are stored in synchronism with said first bus clock;

at least first and second data valid indicators associated respectively with said first and second buffer locations, said first data valid indicator being set synchronously with said first bus clock when data are stored in said first buffer location, said second data valid indicator being set synchronously with said first bus clock when data are stored in said second buffer location;

a first synchronization circuit which receives said first data valid indicator set in synchronism with said first bus clock and synchronizes it with said second bus clock to provide a first synchronized data valid indicator;

a second synchronization circuit which receives said second data valid indicator set in synchronism with said first bus clock and synchronizes it with said second bus clock to provide a second synchronized data valid indicator;

a data valid indicator selector which selects one of said first synchronized data valid indicator and second synchronized data valid indicator and provides the selected data valid indicator as a synchronized output data valid indicator; and a bus state machine operating synchronously with said second bus clock which transfers data from said input/output buffer to said second bus, said bus state machine selecting one of said first and second buffer locations as a source of data to be transferred to said second bus, said bus state machine controlling said data valid indicator selector to select a respective one of said first and second data valid indicators as said output data valid indicator, said bus state machine monitoring said synchronized output data valid indicator from said data valid indicator selector to determine when data from said first bus has been stored in said one of said first and second buffer locations.

2. An apparatus for transferring data between first and second buses which operate asynchronously with respect to each other, said apparatus comprising:

a data storage device comprising a plurality of data storage locations which store data;

a first bus interface state machine connected to said first data bus and operating in synchronism with a first bus clock, said first bus interface state machine transferring data from said first data bus to a selected one of said plurality of data storage locations in synchronism with said first bus clock;

a second bus interface state machine connected to said second data bus and operating in synchronism with a second bus clock which is mutually asynchronous with said first bus clock, said second bus interface state machine transferring data from a selected one of said plurality of data storage locations to said second data bus in synchronism with said second bus clock;

a data present buffer having a respective indicator for each of said plurality of data storage locations, one of said indicators being set in synchronism with said first bus clock in response to said first bus state machine transferring data to a corresponding one of said plurality of data storage locations and being cleared in response to said second bus state machine transferring data from said corresponding one of said plurality of data locations to said second data bus, said second bus interface state machine transferring data from said one of said plurality of data storage locations only when said one of said indicators is set;

a set of synchronization circuits comprising a respective synchronization circuit for each of said indicators, said synchronization circuits connected between said data present buffer and said second bus interface state machine to synchronize said indicators to said second bus clock to provide respective synchronized indicators, said second bus interface state machine controlling a selector having said synchronized indicators as inputs, said selector having an output which provides a selected one of said synchronized indicators directly to said second bus interface state machine.

3. The apparatus as defined in claim 2, wherein said data storage devices are buffers.

4. The apparatus as defined in claim 2, wherein said set of synchronization circuits comprises a first set of synchronization circuits, and wherein said apparatus further comprises a second set of synchronization circuits comprising a second respective synchronization circuit for each of said indicators, said second respective synchronization circuits connected between said data present buffer and said first interface state machine to synchronize said indicators to said first bus interface state machine so that when a selected one of said indicators is reset to an invalid state by said second bus interface state machine in synchronism with said second bus clock, said first bus interface state machine receives said indicator in said invalid state in synchronism with said first bus clock.

5. An apparatus for transferring data between a first data bus and a second data bus, said first and second data buses operating asynchronously with respect to each other, said apparatus comprising:

a buffer comprising first and second data storage locations which store data;

a first bus interface state machine connected to said first data bus and to said buffer to control data transfers from said first data bus to a selected one of said first and second data storage locations in synchronism with a first bus clock signal;

a second bus interface state machine connected to said second data bus and to said buffer to control transfers of data from said buffer to said second data bus in synchronism with a second bus clock signal operating asynchronously with respect to said first bus clock signal;

first and second flag buffers having respective first and second flag outputs coupled to both said first and second bus interface state machines, said output of said first flag buffer being set synchronously with respect to said first bus clock signal when data are transferred into said first data storage location from said first data bus and being cleared synchronously with said second bus clock signal when data are transferred from said first data storage location to said second data bus, said second flag buffer output being set synchronously with respect to said first bus clock signal when data are transferred into said second data storage location from said first data bus and being cleared synchronously with respect to said second bus clock signal when data are transferred from said second data storage location to said second data bus;

a selector controlled by said second bus interface state machine which receives said first flag buffer output and said second flag buffer output and provides a selected flag buffer output to said second bus interface state machine;

a first synchronizer connected between said first flag buffer and said selector and a second synchronizer connected between said second flag buffer and said selectors said first synchronizer synchronizing said first flag output to said second bus clock signal so that said first flag output is synchronized to said second bus clock signal before said first flag output is received by said selector after said first flag output is changed, said second synchronizer synchronizing said second flag output to said second bus clock signal so that said second flag output is synchronized to said second bus clock signal before said second flag output is received by said selector after said second flag output is changed, said selected flag buffer output being provided directly to said second bus interface state machine in synchronism with said second bus clock signal without additional synchronization.

* * * * *